No. 647,522. Patented Apr. 17, 1900.
W. J. RIDEOUT.
OPTICAL GAGE.
(Application filed Aug. 28, 1899.)
(No Model.)
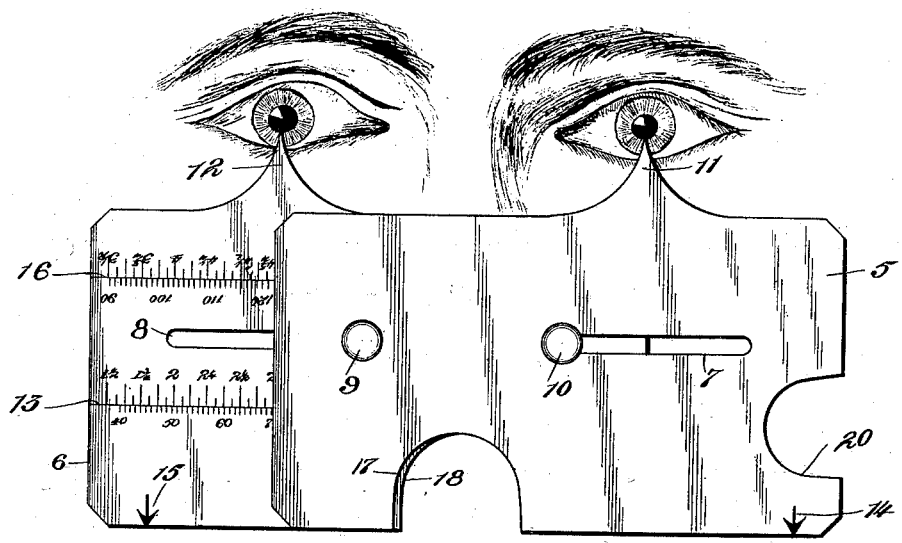
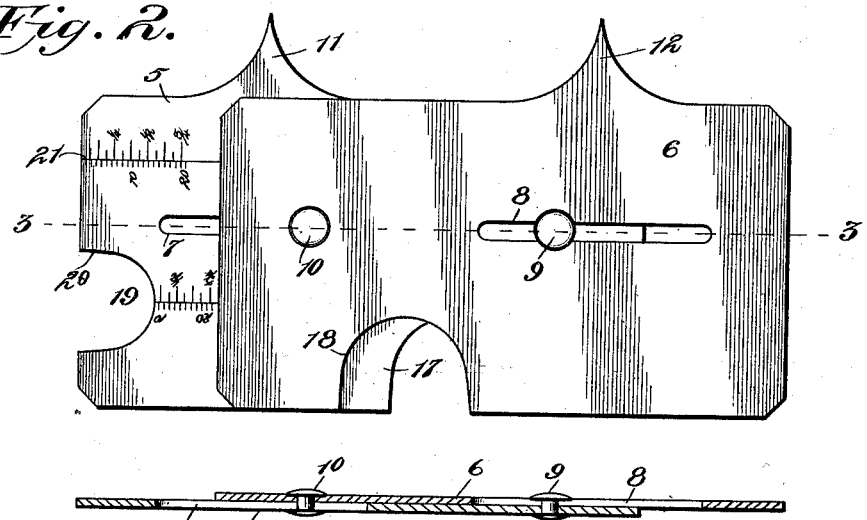
Witnesses
W. J. Rideout  Inventor
By his Attorneys,
C. A. Snow & Co.

UNITED STATES PATENT OFFICE.

WILLIAM J. RIDEOUT, OF FREEPORT, ILLINOIS.

OPTICAL GAGE.

SPECIFICATION forming part of Letters Patent No. 647,522, dated April 17, 1900.

Application filed August 28, 1899. Serial No. 728,752. (No model.)

*To all whom it may concern:*

Be it known that I, WILLIAM J. RIDEOUT, a citizen of the United States, residing at Freeport, in the county of Stephenson and State of Illinois, have invented a new and useful Optical Gage, of which the following is a specification.

My invention is an optical gage for obtaining facial measurements serving to indicate the size of frames for spectacles and eyeglasses in order to fit the same accurately to the face.

The object of the invention is to provide a simple, cheap, and accurate implement adapted to be used easily and quickly and constructed to obtain measurements of the distance between the pupils of the eyes, the width of the face between the temples, and the width and height of the nose, to the accomplishment of which objects the gage is provided with a series of scales, each having indications denoting the measurement in inches and fractions thereof and in millimeters.

With these ends in view the invention consists of a gage having its parts constructed and arranged in the novel manner hereinafter described and claimed.

In the drawings, Figure 1 is an elevation of an optical gage adjusted in position to obtain the pupilary distance of the eyes. Fig. 2 is an elevation looking at the reverse side of the gage. Fig. 3 is a longitudinal sectional view in the plane indicated by the dotted line 3 3 of Fig. 2.

The same numerals of reference are used to indicate like and corresponding parts in each of the several figures of the drawings.

The optical gage of my invention consists of the complemental members 5 6, each in the form of a flat plate and arranged to overlap one another. The overlapping complemental members are slidably connected together, so as to be limited to adjustment lengthwise one upon the other, and in the embodiment of the invention shown by the drawings I provide the member 5 with a straight longitudinal slot 7 and the member 6 with a similar longitudinal slot 8, said slots arranged to register when the two plates are adjusted in coincident flush relation. The member 5 is provided with a transverse rivet 9, which is fitted slidably in the slot 8 of the member 6, and in like manner said member 6 has fastened thereto a rivet 10, which is fitted slidably in the slot 7 of the member 5, whereby the rivets serve to laterally confine the two plates or members in close relation, and at the same time the slots permit the rivets and the plates to be adjusted lengthwise for a limited distance, so as to vary the position of the plates in obtaining the desirable facial measurement.

The plate 5 is provided on one of its side edges with a projecting point 11, and the plate 6 is similarly formed on a corresponding side edge with a projecting point 12, the point on each plate being located at one side of the middle thereof and the two points extending beyond the members or plates for a corresponding distance. The face of the plate or member 6 which is opposed to the member 5 is provided with a scale 13, adapted to be traversed by one edge of the member 5. The projecting points 11 12 on the two members and the scale 13 on one member, adapted to be traversed by the edge of the other member, are employed for obtaining the pupilary distance between the eyes.

Index-lines 14 15 are produced on the members 5 6, respectively, at the opposite edges thereof from the projecting points 11 12, and the member 6 is also provided with a scale 16 on the face thereof which is opposed to the member 5, said scale being produced on the opposite side of the slot 8 from the pupilary scale 13, and said scale 16 adapted to be traversed by one edge of the member 5. The index-lines on the two members and the scale 16 are used for obtaining the distance between the temples of the patient's face. In the edges of the members opposite to the pupilary points 11 12 I provide the recesses 17 18, one recess 17 being provided in one edge of the plate 5 and the other recess 18 being similarly formed in the plate 6. The plates may be adjusted to make one edge of a recess in one plate cross the space between the recess in the other plate, as shown by Fig. 2, for the purpose of indicating the width of the nosepiece, and this measurement may readily be ascertained by reference to a scale 19, which is provided on the inner face of the member 5, said scale 19 adapted to be traversed by one edge of the member 6. The member 5 is also provided in one of its end edges with a recess 20, and on the inner face of said member 5 is a scale 21. The recess 20 and the scale 21 are adapted to be traversed by one edge of the member 6 for the purpose of indicating the height of the nose-bridge.

From the foregoing description, taken in connection with the drawings, it will be observed that I have provided a very simple implement by which the various measurements of a face may be easily obtained, for the purpose of making a spectacle-frame fit accurately to the face and of adjusting lenses in the frame so that the axes thereof will coincide with the axes of the pupils. To obtain the pupilary distance, the members or plates are slid one upon the other and the implement is manipulated by holding it up in front of the patient's eyes until the indicating-points 11 12 register with the pupils, after which the measurement may be read off the scale 13, the edge of the member 5 across the scale indicating the pupilary distance.

To obtain the measurement between the temples, the implement is held up in front of the patient's face and the members are separated until the index-lines 14 15 are opposite the temples, the edge of the plate 5 indicating the measurement on the scale 16.

The members or plates may be separated to throw the recesses 17 18 out of register, and by fitting the implement to the face for one edge of one recess to rest on one side of the nose-bridge and the other edge of the other recess to rest upon the opposite side of the nose-bridge the width of the nose may be ascertained by reference to the scale 19.

The gage may be turned end up and fitted to the face for the nose to enter the recess 20, after which the member 6 may be moved across the scale 21 and to rest upon the nose-bridge, thereby indicating the height of the nose.

For convenience of the optician each scale is subdivided to indicate the measurement in millimeters and in fractions of inches.

The gage of my invention may be constructed of metal, cardboard, or any other material known to the art, and it is evident that slight changes in the form and proportion of parts may be made without departing from the spirit of the invention.

Having thus described the invention, what I claim is—

As a new article of manufacture, an optical gage comprising the companion plates confined laterally and slidably together and each capable of a slidable adjustment one upon the other in the direction of its longitudinal axis, said plates having in one of the straight side edges thereof the coincident notches, 17, 18, and one plate provided in a straight end edge with a deep notch, 19, adapted to be traversed by a corresponding straight end edge of the other plate, the pupil-pointers on opposite side edges of the plates from the notches, 17, 18 therein, the temple-indices on the same opposite side edges of said plates as said notches, and the scales on the opposing faces of the plates, an edge of one plate extending across a plurality of scales upon the other plate, substantially as described.

In testimony that I claim the foregoing as my own I have hereto affixed my signature in the presence of two witnesses.

WILLIAM J. RIDEOUT.

Witnesses:
J. H. VINCENT,
HENRY B. WILLE.